(12) United States Patent
Smith

(10) Patent No.: US 10,005,343 B2
(45) Date of Patent: Jun. 26, 2018

(54) METHODS AND SYSTEMS FOR CONTROLLING A SUNROOF SHADE

(71) Applicant: GM GLOBAL TECHNOLOGY OPERATIONS LLC, Detroit, MI (US)

(72) Inventor: Alex J. Smith, Madison Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days. days.

(21) Appl. No.: 15/294,471

(22) Filed: Oct. 14, 2016

(65) Prior Publication Data
US 2018/0105024 A1    Apr. 19, 2018

(51) Int. Cl.
*B60J 7/00*     (2006.01)
*B60J 7/05*     (2006.01)
*B60J 7/057*    (2006.01)
*B60R 22/00*    (2006.01)

(52) U.S. Cl.
CPC ............ *B60J 7/0007* (2013.01); *B60J 7/05* (2013.01); *B60J 7/0573* (2013.01); *B60Y 2400/301* (2013.01)

(58) Field of Classification Search
CPC .......... B60J 7/0007; B60J 7/05; B60J 7/0573; B60Y 2400/301

USPC ................ 701/36, 49; 296/214, 216.03
See application file for complete search history.

(56) References Cited

U.S. PATENT DOCUMENTS

| | | | | |
|---|---|---|---|---|
| 5,372,401 | A * | 12/1994 | Odoi | B60J 7/003 296/214 |
| 6,056,352 | A * | 5/2000 | Ewing | B60J 7/0038 200/61.69 |
| 7,562,928 | B1 * | 7/2009 | Morazan | B60J 11/00 296/136.01 |
| 2013/0106144 | A1 * | 5/2013 | Nagase | B60J 7/0573 296/223 |
| 2013/0257108 | A1 * | 10/2013 | Sugimoto | B60J 7/0007 296/214 |

* cited by examiner

*Primary Examiner* — Gertrude Arthur Jeanglaude
(74) *Attorney, Agent, or Firm* — Lorenz & Kopf, LLP

(57) ABSTRACT

Methods and systems are providhed for controlling a sunshade associated with a sunroof system of a vehicle. In one embodiment, a method includes: determining, by a processor, a mode of the sunshade to be at least one of a linked mode and an unlinked mode; and selectively controlling, by a processor, a position of the sunshade based on one of a requested position of the sunshade and a requested position of a sunroof window, wherein the selectively is based on the mode.

19 Claims, 6 Drawing Sheets

METHODS AND SYSTEMS FOR CONTROLLING A SUNROOF SHADE

TECHNICAL FIELD

The technical field generally relates to vehicles, and more particularly relates to methods and systems for controlling the operation of a sunroof shade in a vehicle.

BACKGROUND

Some vehicles include sunroof systems to allow for additional sunlight and fresh air to enter the vehicle. For example, the sunroof includes a transparent window disposed within a roof of the vehicle that opens and closes. The position of the window may be controlled by a user via a switch disposed within a passenger compartment of the vehicle.

In some instances, for example on particularly sunny days or on snowy or rainy days, it is desirable to cover the sunroof. Thus, some sunroof systems include a sunshade system. A sunshade system includes a shade that opens and closes. When in the closed position, the shade covers the window of the sunroof, thereby blocking sunlight from entering the vehicle. When in the opened position, the shade is stored in a compartment of the roof to allow the window to be exposed. The position of the shade is typically manually controlled by a user or controlled electronically via a dedicated switch disposed within the vehicle cabin. Having to control the position of the sunshade and the window separately consumes the driver's attention.

Accordingly, it is desirable to provide methods and systems for controlling the sunshade system. Furthermore, other desirable features and characteristics of the present invention will become apparent from the subsequent detailed description and the appended claims, taken in conjunction with the accompanying drawings and the foregoing technical field and background.

SUMMARY

Methods and systems are provided for controlling a sunshade associated with a sunroof system of a vehicle. In one embodiment, a method includes: determining, by a processor, a mode of the sunshade to be at least one of a linked mode and an unlinked mode; and selectively controlling, by a processor, a position of the sunshade based on one of a requested position of the sunshade and a requested position of a sunroof window, wherein the selectively is based on the mode.

In one embodiment, a system includes a first computer module that, by a processor, determines a mode of the sunshade to be at least one of a linked mode and an unlinked mode. The system further includes a second computer module that, by a processor, selectively controls a position of the sunshade based on one of a requested position of the sunshade and a requested position of a sunroof window, wherein the selectively is based on the mode.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
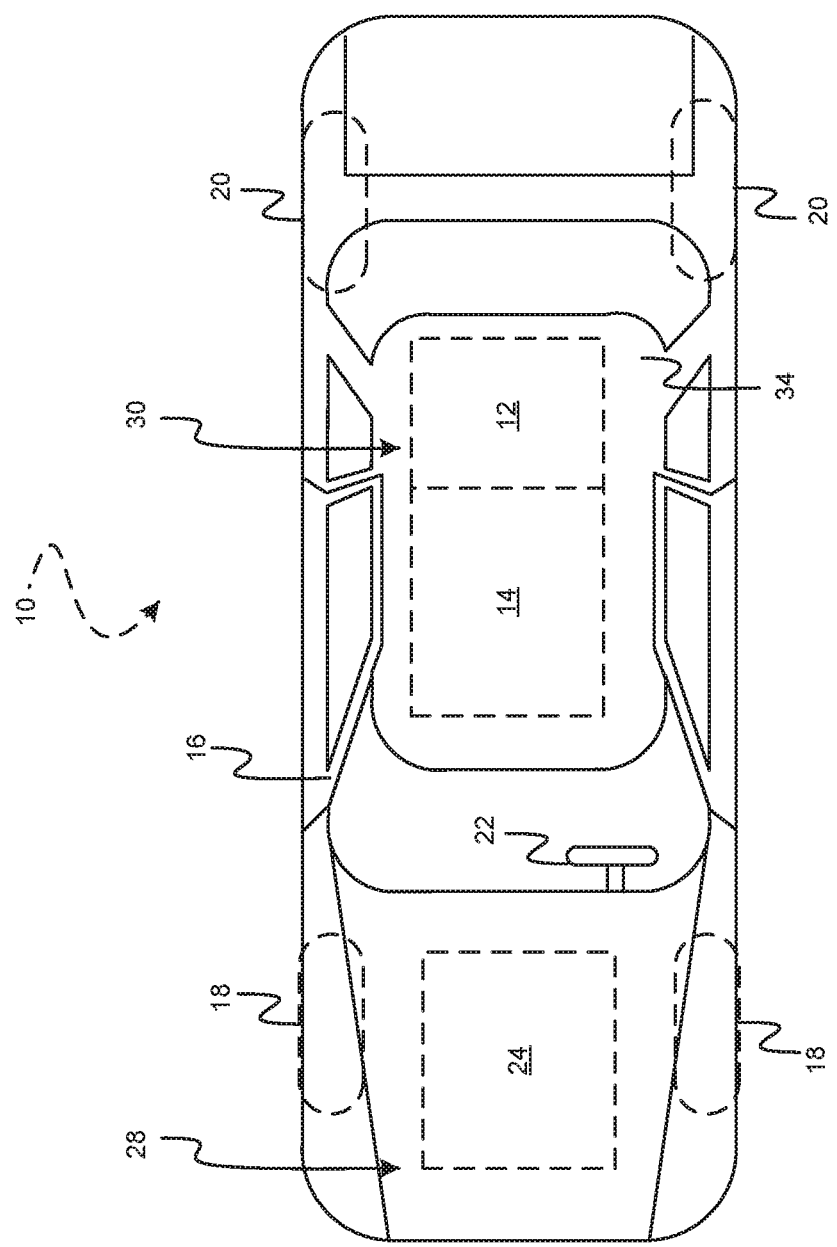
FIG. 1 is a functional block diagram illustrating a vehicle having sunroof system and a sunshade system in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to an application specific integrated circuit (ASIC), an electronic circuit, a processor (shared, dedicated, or group) and/or memory that executes or stores one or more software or firmware programs, a combinational logic circuit, and/or other suitable components that provide the described functionality.

Embodiments of the disclosure may be described herein in terms of functional and/or logical block components and various processing steps. It should be appreciated that such block components may be realized by any number of hardware, software, and/or firmware components configured to perform the specified functions. For example, exemplary embodiments may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that exemplary embodiments may be practiced in conjunction with any number of control systems, and that the vehicle systems described herein are merely exemplary embodiments.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in various embodiments.

Figure 2:
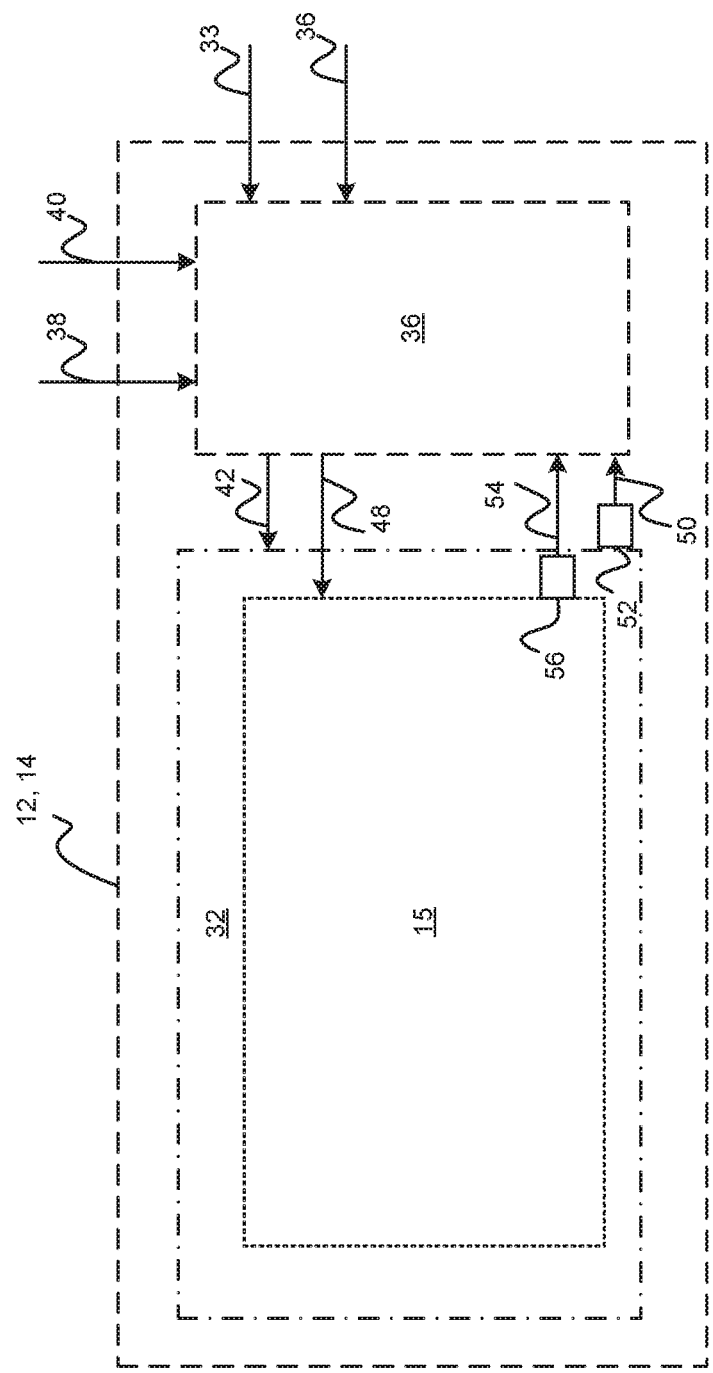
FIG. 2 is a functional block diagram illustrating the sunroof system and the sunshade system in more detail in accordance with various embodiments.

With reference now to FIG. 1, where an illustration of a view of a vehicle 10 equipped with a sunshade system 12 is shown in accordance with various embodiments. As will be discussed in more detail below, the sunshade system 12 is associated with a sunroof system 14 and includes an electronically controlled shade 15 (FIG. 2). The sunshade 15 (FIG. 2) is controlled such that its motion (opening and closing) is selectively synchronized with the sunroof system 14.

Although the context of the discussion herein is with respect to a vehicle, in particular a passenger car, it should be understood that the teachings herein are compatible with all types of automobiles including, but not limited to, sedans, coupes, sport utility vehicles, pickup trucks, minivans, full-size vans, trucks, and buses as well as any other type of autonomous, partial autonomous or non-autonomous automobile having a passenger compartment. Furthermore, the teachings herein are not limited to use only with automobiles but rather, may be used with other types of vehicles as well. For example, the teachings herein may be compatible with vehicles including, but not limited to, aircraft, railway cars, and watercraft. Additionally, the teachings herein may also be implemented in stationary applications such as buildings, residences, and any other structure traditionally having a window or other opening.

As shown in the example of FIG. 1, the vehicle 10 generally includes a body 16, front wheels 18, rear wheels 20, a steering system 22, a propulsion system 24, the sunroof system 14, and the sunshade system 12. The wheels 18-20 are each rotationally coupled to the vehicle 10 near a respective corner of the body 16. The wheels 18 and/or 20 are driven by the propulsion system 24. The wheels 18 are steerable by the steering system 22.

The body 16 is arranged on or integrated with a chassis (not shown) and substantially encloses the components of the vehicle 10. The body 16 is configured to separate a powertrain compartment 28 (that includes at least the propulsion system 24) from a passenger compartment 30 that includes, among other features, seating (not shown) for one or more occupants of the vehicle 10 and control switches for controlling one or more features of the vehicle 10.

As shown in more detail in FIG. 2, the sunroof system 14 generally includes a window 32 located in a roof structure 34 (FIG. 1) and a control module 36 communicatively coupled to the window 32. The window 32 may be configured as a panoramic sunroof or moonroof having one or more glass panels. The window 32 allows natural light to fill the passenger compartment 30 (FIG. 1) during the day. At night, the window 32 may be used for star and moon gazing.

The window 32 is movable to an open position to allow air to enter the vehicle 10 and to a closed position to prevent air from entering the vehicle 10. In various embodiments, the window 32 can be opened or closed to a number of positions (e.g., a partially vented position, a vented position, a partially open position, a fully open position, a partially closed position, a closed position, etc.) via a sliding or tilting action to allow air to enter the vehicle 10. For example, the window 32 can be opened using a tilting or vertical displacement to allow for partial venting. In another example, the window 32 can be opened using a sliding or horizontal displacement to allow for partial or complete opening.

The opening and closing of the window 32 is controlled by the control module 36 and one or more electromechanical actuators (not shown). For example, the control module 36 receives signals 38 from a control switch (not shown) disposed within the passenger compartment 30 of the vehicle 10 or receives messages 40 from another control module (not shown) of the vehicle 10. The control module 36 interprets the signals 38 or messages 40 and generates control signals 42 to the electromechanical actuators to control the opening and the closing of the window 32.

The sunshade system 12 includes the sunshade 15 that is housed in the roof structure 34 and a control module 36. In embodiments having multiple glass panels in the window 32, it is to be understood that each glass panel may have its own sunshade or share a common sunshade. For exemplary purposes, the disclosure will be discussed in the context of the sunshade system 12 having a single sunshade 15.

The control module 36 is shown as a single control module that controls both the sunroof system 14 and the sunshade system 12. As can be appreciated, in various embodiments, two separate (one that controls the sunroof system 14 and one that controls the sunshade system 12) or any number of control modules that communicate over a communication medium can be implemented.

The sunshade 15 is movable between a stored position and a use position. In the stored position, the sunshade 15 is housed in the roof structure 34 (FIG. 1) such that the window 32 is fully uncovered. In the use position, the sunshade 15 is positioned to fully or partially cover the window 32 to block out light or offer greater seclusion. The opening and closing of the sunshade 15 is controlled by the control module 36 and one or more electromechanical actuators (not shown). For example, the control module 36 receives signals 44 from the control switch (e.g., the same switch as the switch to control the sunroof system 14 or a separate switch) disposed within the passenger compartment 30 of the vehicle 10 or receives messages 46 from another control module (not shown) of the vehicle 10. The control module 36 interprets the signals 44 or messages 46 and generates control signals 48 to the electromechanical actuators to control the opening and the closing of the sunshade 15. The control module 36 generates the control signals 48 based on a synchronization method disclosed herein. In particular, the control module 36 generates the control signals 48 to the sunshade 15 such that the opening and closing of the sunshade 15 is synchronized with the opening and closing of the sunroof window 32 unless a request to break the synchronization and only control movement of the sunshade 15 is received (e.g., by a user or other requesting control module).

For example, the control module 36 operates the sunshade 15 according to at least two modes, a linked mode and an unlinked mode. When in the linked mode, the position of the sunshade 15 will follow the position of the sunroof window 32 during any open and closing motion. When in the unlinked mode, the sunshade 15 will remain in its position unless the customer commands it to move (e.g., by manipulating the switch) or until the sunshade 15 becomes linked again.

In various embodiments, the sunshade 15 begins in the linked mode. The sunshade 15 transitions to the unlinked mode based on a request to open only the sunshade 15. The sunshade 15 transitions back to the linked mode when the sunroof is opened to the sunshade position (e.g., any sunroof window opening motion that would cause the sunshade 15 to become more closed than the sunroof window 32 will cause the sunshade 15 to become linked again and start opening with the sunroof window 32) or when the sunshade 15 is closed to the position of the sunroof window (e.g., if the sunroof is stopped at vent, the sunshade will close to the vent position and become linked, if the sunroof is fully closed, the sunshade will fully close and become linked again, etc.).

In various embodiments, the control module 36 determines a position of the window 32 based on signals 50 received from a position sensor 52 associated with the window 32. In various embodiments, the control module 36 determines a position of the sunshade 15 based on signals 54 received from a position sensor 56 associated with the sunshade 15.

Figure 3:
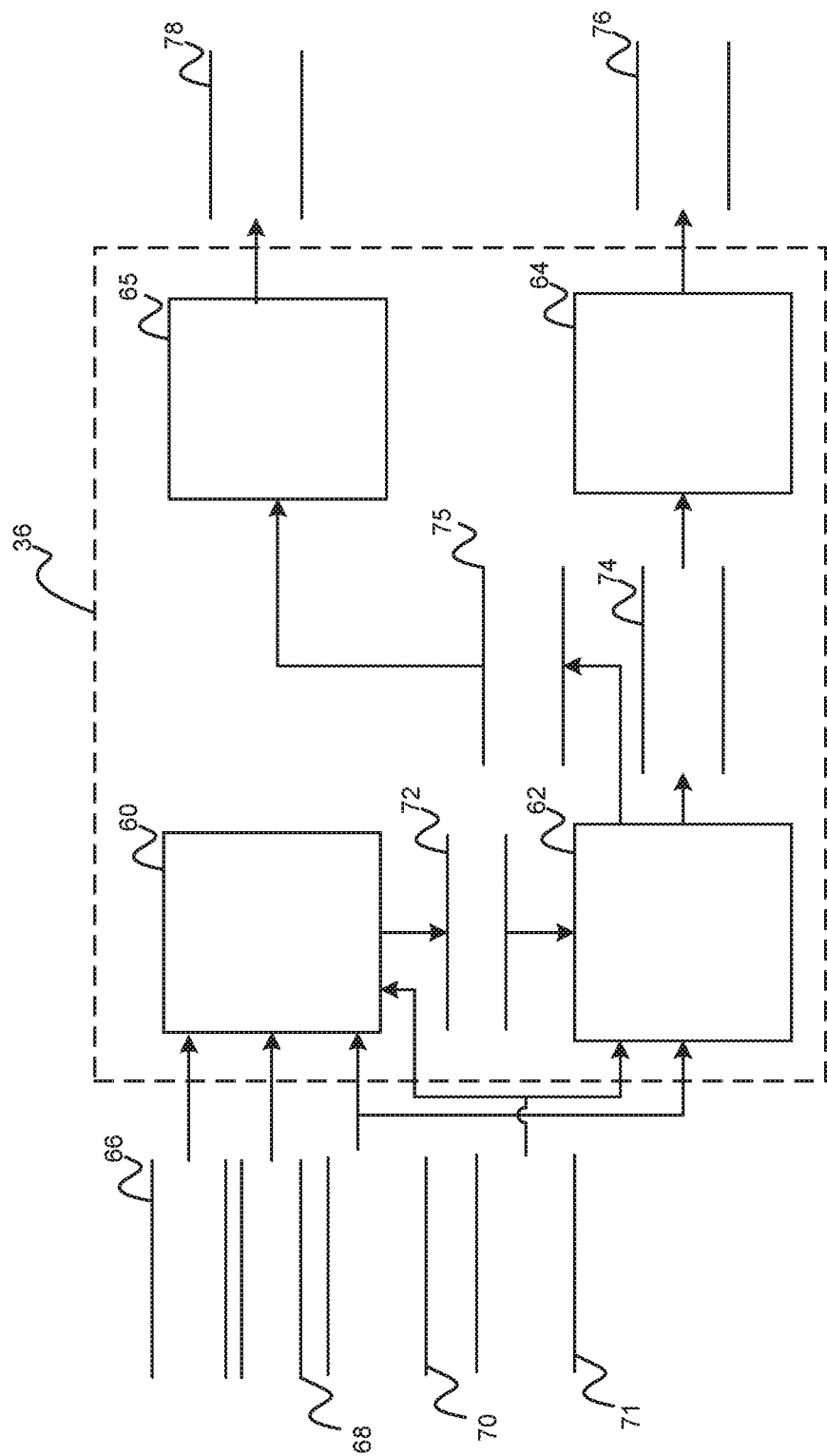
FIG. 3 is a dataflow diagram illustrating a control module of the sunshade system in accordance with various embodiments.

Referring now to FIG. 3 and with continued reference to FIGS. 1 and 2, a dataflow diagram illustrates modules of the control module 36 in accordance with various exemplary embodiments. As can be appreciated, various exemplary embodiments of the control module 36, according to the present disclosure, may include any number of modules and/or sub-modules. In various exemplary embodiments, the modules and sub-modules shown in FIG. 3 may be combined and/or further partitioned to similarly control the operation of the sunshade 15 of the sunshade system 12. In various embodiments, the control module 36 receives inputs from the switches (not shown) of the vehicle 10, from the position sensors 52, 56 associated with the window 32 and the sunshade 15 respectively, from other modules (not shown) within the control module 36, and/or from other control modules (not shown) within the vehicle 10. In various embodiments, the control module 36 includes a mode determination module 60, a position determination module 62, a sunshade control module 64, and a sunroof control module 65.

The mode determination module 60 receives as input sunshade position data 66, sunroof position data 68, sunshade open/close request data 70, and sunroof open/close request data 71. The sunshade position data 66 can be determined from the signals 54 from the position sensor 56 associated with the sunshade 15 and can indicate a position of the sunshade 15. The sunroof position data 68 can be based on the signals 50 from the position sensor 52 associated with the sunroof. 32 and can indicate a position of the sunroof window 32. The sunshade open/close request data 70 can be based on the signals 44 or the messages 46 received by the control module 36 and can indicate that a request is received for the sunshade 15, and a position to move the only sunshade 15 to. The sunroof open/close request data 71 can be based on the signals 38 or the messages 40 received by the control module 36 and can indicate that a request is received for the sunroof window 32, and a position to move the sunroof window 32 to.

Based on the received data 66-71, the mode determination module 60 determines a current mode 72 of the sunshade 15. As discussed above, the current mode 72 can be at least one of a linked mode and an unlinked mode. For example, the mode determination module 60 sets the default of the current mode 72 to be the linked mode. The mode determination module 60 then sets the current mode 72 to the unlinked mode when the following conditions are met:
1. The current mode 72 is the linked mode; AND
2. the open/close request data 70 indicates a request to open only the sunshade 15.

The mode determination module 60 sets the current mode 72 to the linked mode when the following conditions are met:
1. The current mode 72 is the unlinked mode; AND
2. the sunshade position data 66 and the sunroof position data 68 indicate that the sunshade 15 is in a position equal to the position of the window 32.

Additionally, based on how fast the position data is sampled, the mode determination module 60 can include a tolerance for setting the mode to the linked mode for example based on speed of evaluating the data and/or based on accuracy of the position data. In various embodiments, the mode determination module 60 sets the current mode 72 of the sunshade 15 to the linked mode when the sunroof window 32 is just past the sunshade 15, for example, when the following conditions are met:
1. The current mode 72 is the unlinked mode;
2. the sunroof open/close request data 71 indicates that a sunroof open request was received; AND
3. the sunshade position data 66 and the sunroof position data 68 indicate that the sunshade 15 is in a position less than the position of the window 32.

Or, in another example, when the following conditions are met:
1. The current mode 72 is the unlinked mode;
2. an only sunroof close request was received; AND
3. the sunshade position data 66 and the sunroof position data 68 indicate that the sunshade 15 is in a position greater than the position of the sunroof window 32.

The position determination module 62 receives as input the current mode 72, the sunshade open/close request data 70, and/or the sunroof open/close request data 71. Based on the received data 70-72, the position determination module 62 determines a desired position 74 to control the sunshade 15 to and determines a desired position 75 to control the sunroof window 32 to. For example, if the current mode 72 is the linked mode, the desired position 74 is set to the requested sunroof position as indicated by the sunroof open/close request data 71 and the desired position 75 of the sunroof is set to the sunroof position as indicated by the sunroof open/close request data 71. In another example, if the current mode 72 is the unlinked mode, the desired position 74 is set to the requested sunshade position as indicated by the sunshade open/close request data 70. In still another example, the desired position 75 of the sunroof is set to the sunroof position as indicated by the sunroof open/close request data 71.

The sunshade control module 64 receives as input the desired position 74 of the sunshade. The sunshade control module 64 generates control signals 76 to the sunshade 15 to control the actual position of the sunshade 15 to the desired position 74.

The sunroof control module 65 receives as input the desired position 75 of the sunroof. The sunshade control module 64 generates control signals 78 to the sunroof window 32 to control the actual position of the sunroof window 32 to the desired position 75.

Figure 4:
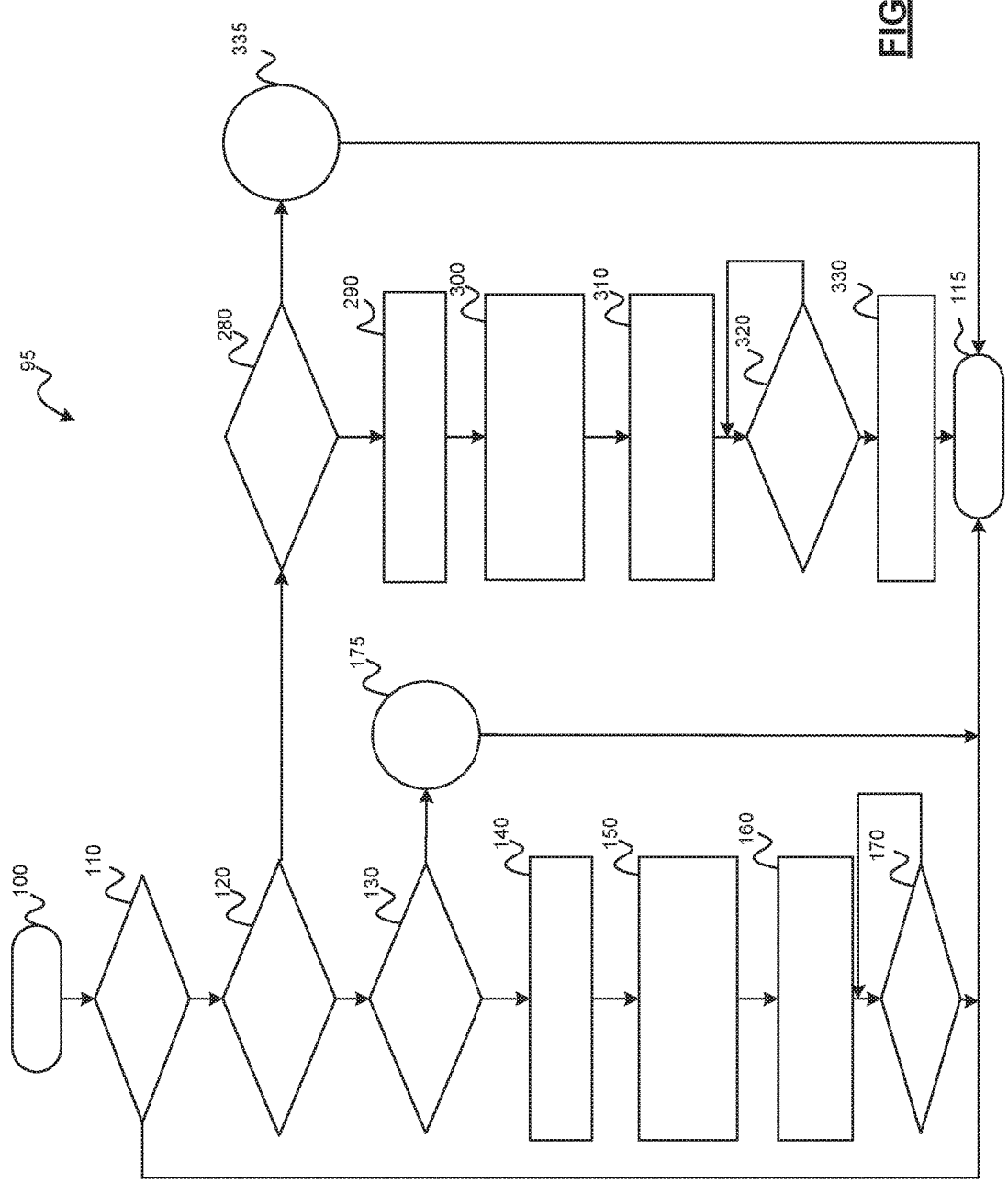
FIGS. 4-6 are flowcharts illustrating a method of controlling a sunshade system in accordance with various embodiments.
Figure 5:
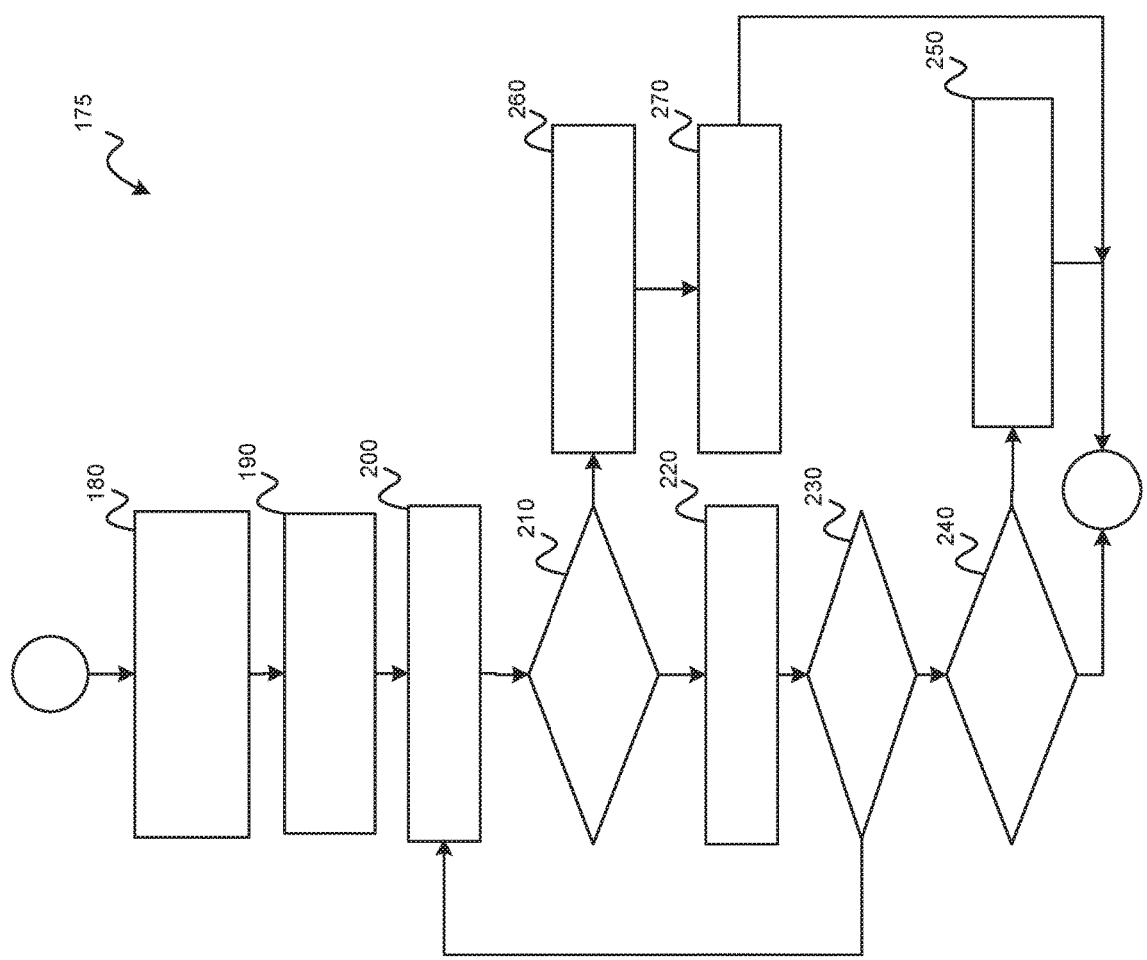
Figure 6:
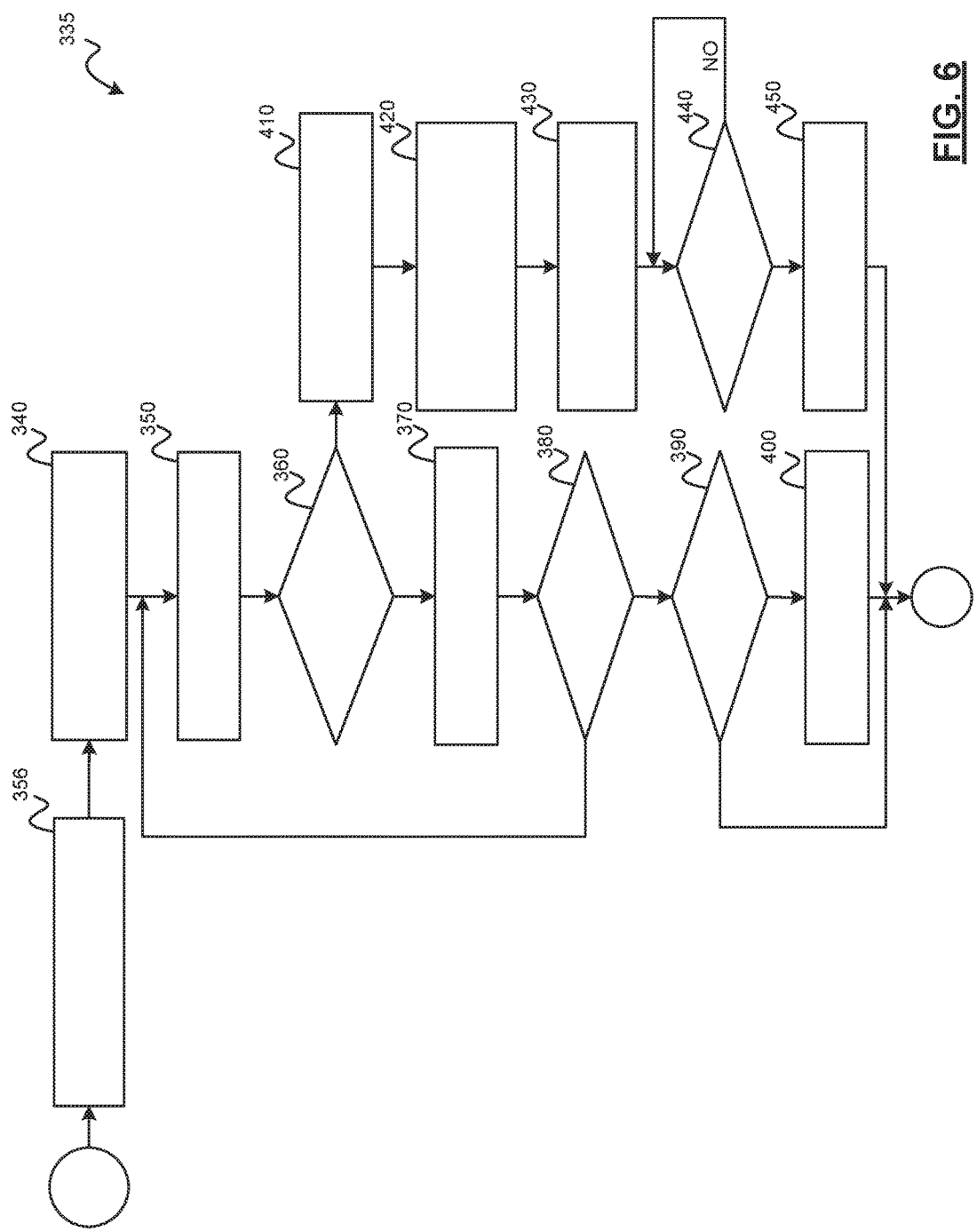

With reference now to FIGS. 4, 5, and 6, and with continued reference to FIGS. 1, 2, and 3, flowcharts illustrate a method 95 of controlling the sunshade 15 of the sunshade system 12 and the sunroof window of the sunroof system 14 in accordance with various embodiments. As can be appreciated in light of the disclosure, the order of operation within the method is not limited to the sequential execution as illustrated in FIG. 4-6, but may be performed in one or more varying orders as applicable and in accordance with the present disclosure.

In one example, the method may begin at 100. It is determined whether open/close request data 70, 71 is received at 110. If open/close request data 70, 71 is not received at 110, the method may end at 115.

If, however, open/close request data 70, 71 is received at 110, it is determined whether the open/close request data 71 is a sunshade only open/close request at 120. If the open/close request data 70 is a sunshade only open/close request at 120, the current mode 72 is evaluated at 130. For example, if the current mode 72 is the linked mode, the current mode 72 is set to the unlinked mode at 140 to allow the sunshade 15 to be separately controlled and unsynchronized with the sunroof window 32. The desired position 74 of the sunshade 15 is determined based on the sunshade position indicated by the open/close request data 70 at 150. The control signals 76 are generated to the sunshade 15 to control the position of the sunshade 15 to the desired position 74 at 160. The control signals 76 are generated until the sunshade 15 reaches the desired position 74 at 170. Thereafter, the method may end at 115.

If, however, at 130 the current mode 72 is not the linked mode rather the current mode 72 is the unlinked mode, the method proceeds to 175 (shown in FIG. 5). For example, as shown in FIG. 5, the desired position 74 of the sunshade 15 is determined based on the sunshade position indicated by the open/close request data 70 at 180. The control signals 76 are generated to the sunshade 15 to control the position of the sunshade 15 to the desired position 74 at 190.

The sunshade position data 66 and the sunroof position data 68 are obtained at 200 and evaluated at 210. If the sunshade position data 66 and the sunroof position data 68 indicate that the current position of the sunshade 15 is equal to the current position of the sunroof window 32 at 210, the current mode is set to the linked mode at 260; and control signals 76 are generated to stop the sunshade 15 from further movement past the sunroof window 32 at 270. Thereafter, the method may end at 115 (FIG. 4).

If, however, at 210 the current position of the sunshade 15 is not equal to the current position of the sunroof window 32, the current mode 72 is maintained as the unlinked mode at 220. It is determined whether the open/close action is complete at 230. If the open/close action is not complete at 230, the method proceeds to 200 where new sunshade position data 66 and sunroof position data 68 is obtained and evaluated at 210. If, at 230, the open/close action is complete, and if the sunshade position data 66 and the sunroof position data 68 indicate that the current position of the sunshade 15 is equal to the current position of the sunroof window 32 at 240, the current mode is set to the linked mode at 250. Thereafter, the method may end at 115 (FIG. 4). Otherwise, the current mode is maintained in the unlined mode and the method may end at 115 (FIG. 4).

With reference back to FIG. 4, at 120, if the open/close request data 70, 71 indicates that the request is not for the sunshade only rather, it is for the sunroof window 32, the current mode 72 is evaluated at 280. For example, if the current mode 72 is the linked mode at 280, the current mode 72 is maintained as the linked mode at 290. The desired position 74 of the sunshade 15 and the desired position 75 of the sunroof window 32 are determined based on the sunroof window position indicated in the open/close request data 71 at 300. The control signals 76 are generated to the sunshade 15 to control the position of the sunshade 15 to the desired position 74; and the control signals 78 are generated to the sunroof window 32 to control the position of the sunroof window 32 to the desired position 75 at 310. Once it is determined that the open/close motion of the sunroof is complete at 320, the control signals 76 are generated to stop the movement of the sunshade 15 at 330. Thereafter, the method may end at 115.

If, however, at 280, the current mode 72 is not the linked mode, rather it is the unlined mode, the method proceeds to 335. For example, the desired position 75 of the sunroof is determined based on the sunroof open/close request 71 at 356. The control signals 78 are generated to control the sunroof window 32 to the desired position 75 at 340. The sunshade position data 66 and the sunroof position data 68 are obtained at 350 and evaluated at 360. If the sunshade position data 66 and the sunroof position data 68 indicate that the current position of the sunshade 15 is equal to the current position of the sunroof window 32 at 360, the current mode 72 is set to the linked mode at 410. The desired position 74 of the sunshade 15 is determined based on the window position indicated in the open/close request data 70 and the sunroof position data 68 at 420. The control signals 76 are generated to the sunshade 15 to control the position of the sunshade 15 to the desired position 74 at 430. Once it is determined that the open/close motion of the sunroof is complete at 440, the control signals 76 are generated to stop the movement of the sunshade 15 at 450. Thereafter, the method may end at 115 (FIG. 4).

If, at 360, the sunshade position data 66 and the sunroof position data 68 indicate that the current position of the sunshade 15 is not equal to the current position of the window 32 at 310, the current mode 72 is maintained as the unlinked mode at 370. It is determined whether the open/close action of the window 32 is complete at 380. If the open/close action is not complete, the method continues at 340 where control signals 78 are generated to control the sunroof window 32.

If, however, at 390, the open/close motion of the sunroof is complete, and if, at 390, the sunshade position data 66 and the sunroof position data 68 indicate that the current position of the sunshade 15 is equal to the current position of the window 32, the current mode 72 is set to the linked mode at 400; and the method may end at 115 (FIG. 4). Otherwise, the current mode 72 is maintained as the unlinked mode and the method may end at 115 (FIG. 4).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for controlling a sunshade associated with a sunroof system of a vehicle, comprising:
    determining, by a processor, a mode of the sunshade to be at least one of a linked mode and an unlinked mode based on an evaluation of a current operating mode of the sunshade, and an open/close request of the sunshade, and an open/close request of the sunroof window, wherein the linked mode and the unlinked mode are relative to the sunroof window of the sunroof system; and
    selectively controlling, by the processor, a position of the sunshade based on the mode.

2. The method of claim 1, wherein the determining the mode is based on a current position of the sunshade.

3. The method of claim 1, wherein the determining the mode is based on a current position of the sunroof window.

4. The method of claim 1, wherein the determining comprises determining the mode to be the unlinked mode based on the open/close request of the sunshade indicating to only control the sunshade.

5. The method of claim 1, wherein the determining comprises determining the mode to be the linked mode based on a position of the sunshade and the sunroof window.

6. The method of claim 5, wherein the determining further comprises determining the mode to be the linked mode when the position of the sunshade is equal to the position of the sunroof window.

7. The method of claim 5, wherein the determining further comprises determining the mode to be the linked mode when the position of the sunshade is greater than the position of the sunroof window and the open/close request of the sunroof window indicates a request to close the sunroof window.

8. The method of claim 5, wherein the determining further comprises determining the mode to be the linked mode when the position of the sunshade is less than the position of the sunroof window and the open/close request of the sunroof window indicates a request to open the sunroof window.

9. The method of claim 1, wherein the selectively controlling comprises selectively controlling the position of the sunshade based on a requested position of the sunshade when the mode is the unlinked mode.

10. The method of claim 1, wherein the selectively controlling comprises selectively controlling the position of the sunshade based on a requested position of the sunroof window when the mode is the linked mode.

11. A system for controlling a sunshade associated with a sunroof system of a vehicle, comprising:
    a first computer module that, by a processor, determines a mode of the sunshade to be at least one of a linked mode and an unlinked mode based on an evaluation of a current operating mode of the sunshade, and an open/close request of the sunshade, and an open/close request of the sunroof window, wherein the linked mode and the unlinked mode are relative to the sunroof window of the sunroof system; and
    a second computer module that, by a processor, selectively controls a position of the sunshade based on the mode.

12. The system of claim 11, wherein the first computer module determines the mode to be the unlinked mode based on a request to only control the sunshade.

13. The system of claim 11, wherein the first computer module determines the mode to be the linked mode based on a position of the sunshade and the sunroof window.

14. The system of claim 13, wherein the first computer module determines the mode to be the linked mode when the position of the sunshade is equal to the position of the sunroof window.

15. The system of claim 13, wherein the first computer module determines the mode to be the linked mode when the position of the sunshade is greater than the position of the sunroof window and the open/close request of the sunroof window indicates a request to close the sunroof window.

16. The system of claim 13, wherein the first computer module determines the mode to be the linked mode when the position of the sunshade is less than the position of the sunroof window and the open/close request of the sunroof window indicates a request to open the sunroof window.

17. The system of claim 13, wherein the second computer module selectively controls the position of the sunshade based on a requested position of the sunshade when the mode is the unlinked mode.

18. The system of claim 11, wherein the second computer module selectively controls the position of the sunshade based on a requested position of the sunroof window when the mode is the linked mode.

19. A system for controlling a sunshade associated with a sunroof system of a vehicle, comprising:
    a sunroof system;
    a sunshade system associated with the sunroof system; and
    a control module that, by a processor, determines a mode of the sunshade to be at least one of a linked mode and an unlinked mode based on an evaluation of a current operating mode of the sunshade, and an open/close request of the sunshade, and an open/close request of the sunroof, wherein the linked mode and the unlinked mode are relative to a sunroof window of the sunroof system, that selectively controls a position of the sunshade based on the mode.

* * * * *